United States Patent
Schuler et al.

(10) Patent No.: US 10,922,952 B1
(45) Date of Patent: Feb. 16, 2021

(54) SYSTEM AND METHOD FOR PUBLIC SAFETY ANSWERING POINT TO EMERGENCY OPERATIONS CENTER COMMUNICATIONS

(71) Applicant: MOTOROLA SOLUTIONS, INC., Chicago, IL (US)

(72) Inventors: Francesca Schuler, Palatine, IL (US); Ross Venhuizen, Chicago, IL (US); James C Duran, Palatine, IL (US); Jeremy Smith, Menifee, CA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/554,677

(22) Filed: Aug. 29, 2019

(51) Int. Cl.
*G08B 25/00* (2006.01)
*H04W 4/90* (2018.01)
*H04M 3/523* (2006.01)
*H04M 3/51* (2006.01)
*G08B 26/00* (2006.01)

(52) U.S. Cl.
CPC ......... *G08B 25/006* (2013.01); *G08B 26/004* (2013.01); *H04M 3/5116* (2013.01); *H04M 3/523* (2013.01)

(58) Field of Classification Search
CPC . G08B 25/006; G08B 26/004; H04M 3/5116; H04M 3/523; H04W 4/029; H04W 4/90; G10L 15/22; G10L 15/26
See application file for complete search history.

(56) References Cited

U.S. PATENT DOCUMENTS

| | | |
|---|---|---|
| 6,600,812 B1 | 7/2003 | Gentillin et al. |
| 7,817,982 B1 | 10/2010 | Chu et al. |
| 8,078,162 B2 | 12/2011 | Deaton et al. |
| 9,609,497 B2 * | 3/2017 | Li .......................... H04W 4/90 |
| 10,291,777 B1 * | 5/2019 | Luo ..................... H04M 3/2272 |
| 10,498,894 B1 * | 12/2019 | Mongrain ............ H04M 3/5116 |
| 10,764,187 B2 * | 9/2020 | Dahan .................. G08B 25/006 |
| 2004/0102178 A1 | 5/2004 | Williams |
| 2006/0262907 A1 | 11/2006 | Diroo et al. |

(Continued)

FOREIGN PATENT DOCUMENTS

| | | |
|---|---|---|
| WO | 2014072910 A1 | 5/2014 |
| WO | 2017100220 A1 | 6/2017 |

OTHER PUBLICATIONS

The International Search Report and the Written Opinion corresponding patent application serial No. PCT/US2020/045838 filed 12 Aug. 2020, dated 4 Nov. 2020, all pages.

*Primary Examiner* — Khawar Iqbal

(57) ABSTRACT

A method for public safety answering point to emergency operations center communications is provided. The method may comprise monitoring incidents at a public safety answering point (PSAP) to determine how many incidents are emergency operations center (EOC) affecting incidents. The method may further comprise determining a PSAP status, the status based in part on the EOC affecting incidents. The method may further comprise sending the PSAP status to an EOC, wherein the EOC determines if a response will be initiated, based, in part, on the PSAP status. The method may further comprise receiving an indication from the EOC that the response will be initiated. The method may further comprise altering a PSAP operations based on the EOC initiating the response.

14 Claims, 4 Drawing Sheets

(56) References Cited

U.S. PATENT DOCUMENTS

| | | |
|---|---|---|
| 2013/0252649 A1 | 9/2013 | Siomina et al. |
| 2016/0316493 A1 | 10/2016 | Davis et al. |
| 2018/0053401 A1* | 2/2018 | Martin ................. G08B 29/188 |
| 2018/0301017 A1* | 10/2018 | Dizengof ............. G08B 25/016 |
| 2019/0104393 A1* | 4/2019 | Lhamon ............... G08B 25/016 |
| 2019/0174289 A1* | 6/2019 | Martin .................. H04W 4/029 |
| 2019/0306664 A1* | 10/2019 | Mehta ...................... H04W 4/90 |
| 2019/0335308 A1* | 10/2019 | Patton ...................... G10L 15/26 |
| 2020/0084318 A1* | 3/2020 | Amin ................ H04W 12/1204 |
| 2020/0100084 A1* | 3/2020 | Martin .................... H04L 67/18 |
| 2020/0244805 A1* | 7/2020 | Philbin ................ H04M 3/5116 |
| 2020/0314240 A1* | 10/2020 | Leavitt ................... G16H 80/00 |

* cited by examiner

SYSTEM AND METHOD FOR PUBLIC SAFETY ANSWERING POINT TO EMERGENCY OPERATIONS CENTER COMMUNICATIONS

BACKGROUND

A Public Safety Answering Point (PSAP) is a call center where calls to emergency telephone numbers for police, fire, and emergency medical services (e.g. calls to 911) may be received. PSAPs typically cover a defined geographic region. A call taker may gather details related to an incident and cause appropriate resources to be dispatched to handle the incident. PSAPs typically handle smaller scale incidents. Example incidents can include traffic accidents, hit and run, standalone home fire, individual health emergency, burglary, assault, domestic violence (e.g. person experiencing a heart attack), etc. Although such incidents may be extremely traumatic to the specific individuals/families experiencing the incident, the impact of the incident generally does not extend past a relatively small number of people. PSAPs are generally well equipped to handle incidents related to "normal" life.

An Emergency Operations Center (EOC) may handle larger scale incidents and may exist at multiple levels (e.g. State, County, City, Municipality, etc.). An EOC may have the same physical coverage area as one or more PSAPs. An EOC may cover incidents that affect large portions of a community. For example, natural disasters (e.g. tornado, earthquake, etc.), active shooters, infrastructure failure, etc. A lightning strike that sets an individual house on fire is a type of incident that may be best handled by a PSAP. A lightning strike that starts a multiple acre forest fire that threatens hundreds or thousands of homes is the type of incident that would be handled by an EOC. In general, EOCs will handle incidents that impact communities at a larger scale. EOCs may need to address basic life needs for families at a larger scale (e.g. food, shelter, mass casualty, infrastructure repair, etc.). EOCs are better equipped to handle incidents that are "not normal" life

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
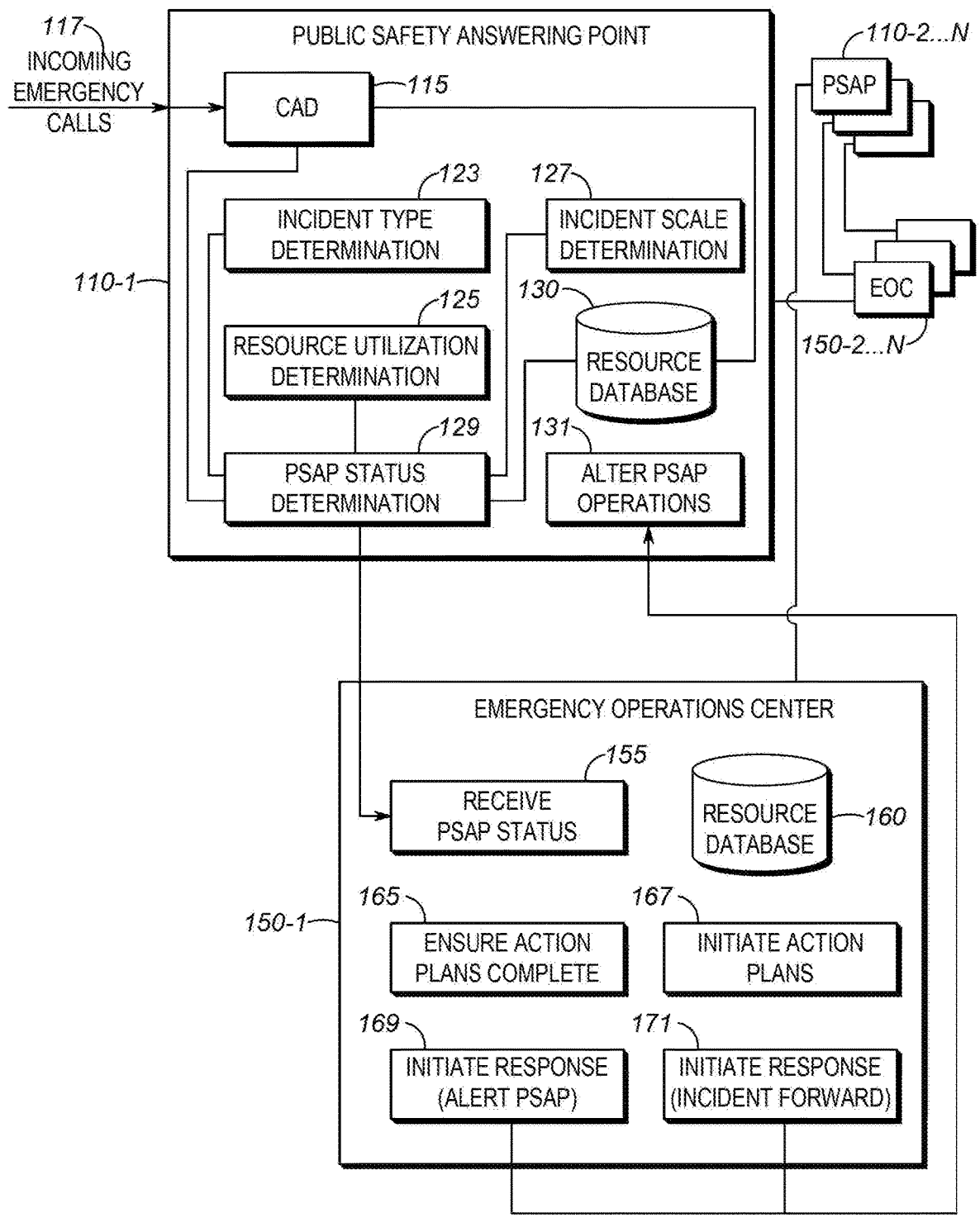
FIG. 1 is an example of a PSAP/EOC environment in which the public safety answering point to emergency operations center communications techniques described herein may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In general, calls related to incidents may be received at a PSAP as they occur. Call takers and/or dispatchers may receive these calls, and dispatch available resources as necessary. These periods of time may be thought of as "normal" operations, where all incidents are handled by the PSAP. During normal operation, the EOC remains inactive.

At some point, the nature and number of the incoming calls may begin to suggest that a wider spread incident is occurring. For example, one or two calls about structure fires within a city in a given time period may be consistent with historical rates of incidents within the PSAP coverage area, and might be considered normal. If the rate of calls for structure fires jumps to 20 or 30 in a similar time period and the calls are all coming from generally the same location, this may indicate a larger issue (e.g. natural gas line explosion, forest fire, etc.). Once it is determined that an incident is affecting the community at large (e.g. not normal), the EOC may initiate a response.

Once the EOC has initiated a response, the division of roles and responsibilities between the PSAPs and the EOC follow well established action plans. For example, the PSAP will continue to answer all incoming calls, but all calls related to incidents that are not normal will be attended to by the EOC. For example, consider a case where a PSAP has a swift water rescue team available for dispatch to rescue people who have fallen into a river. In a normal operation, the team may be dispatched by the PSAP to perform rescues of individuals (e.g. there are not large numbers of requests for water rescue being received). When a flood occurs, it may be expected that a large number of requests for water rescue may be received and an EOC may initiate a response.

Part of the response may include transferring control of the swift water rescue team to the EOC. When new water rescue requests are received at the PSAP, the handling of those calls may be delegated by the PSAP to the EOC for triage and prioritization. In the present example, the EOC may organize all calls received for water rescue, and dispatch the swift water rescue team as appropriate. The PSAP continues to handle all other non EOC related calls itself. For example, a call for police to respond to a break in at a house would not be delegated to the EOC, because it is not related to a major incident that is being handled by the EOC.

Although the division of roles and responsibilities between PSAPs and EOCs has been well defined once the EOC has determined that a response will be initiated, a problem arises in how the EOC determines it will initiate a response in the first place. Today, EOCs typically do not have visibility into the systems that PSAPs use to handle incidents. For example, PSAPs may use call taking systems to manage incoming calls and computer aided dispatch (CAD) systems to dispatch responders to handle the incidents associated with those incoming calls. For ease of description, the remainder of the disclosure will use the term CAD to generically describe the process of receiving calls and dispatching responders. It should be understood that this is not intended to imply that the functionality must be integrated into a single platform.

Because the EOC systems do not communicate with PSAP CAD systems, it is not possible for the EOC to programmatically monitor the PSAPs to determine the type, number, scale, etc. of EOC impacting calls received by the PSAP. In some cases, EOC personnel may monitor public safety radio channels (e.g. dispatch channels) to get an idea of the types of calls being handled. Often times, EOC personnel may call PSAP personnel over the telephone to get an information on the need for an EOC to initiate a response. In some cases, EOC personnel may actually physically reside at the PSAP in order to monitor the types of calls being received.

Further exacerbating the problem is that in many cases, a single EOC may be responsible for the geographic areas covered by multiple PSAPs. When looking at the incidents received from each individual PSAP, it may appear that there is no need for the EOC to initiate a response, because each PSAP may appear to be operating normally. However, when aggregated across all PSAPs associated with an EOC, the incidents may be of the type that should be handled by the EOC. Continuing with the flood example, an individual PSAP having a single swift water rescue request may seem normal. However, multiple PSAPs within the coverage area of a single EOC all receiving swift water rescue requests at the same time may indicate a larger scale incident that should be handled by the EOC.

The decision on when to activate an EOC has largely been left to human decision makers operating on gut feelings and past experience. The human decision makers often do not have visibility into all the incidents or the types of incidents being handled by the PSAPs. Thus, the human decision makers are left with trying to decide if an EOC response should be initiated without necessarily having all the pertinent data.

The techniques described herein solve these problems and others, individually and collectively. A PSAP will report its status to the EOC. The PSAP status includes information about the incident types of calls being received at the PSAP, numbers of calls being received, and if those incident types are types that would affect the EOC. PSAP status may also include geographic locations of calls being received.

PSAP status may also include information such as the percentage of PSAP resources that are currently being deployed (resource loading) as well as the percentage of those resources being deployed on calls that are EOC affecting. The PSAP status may also include an indication of how many calls are being received by the PSAP concurrently (e.g. call queue). The PSAP status for each PSAP assigned to an EOC may be sent to the EOC.

The EOC may monitor the received PSAP status, and based on the status, determine what action to take. The action can include, for example, take no action, prepare for action, initiate response, and take control of response. It should be understood that these are simply examples of the types of actions the EOC may take and are not intended to imply that these are the only possible actions.

When the EOC initiates a response, this may trigger the EOC to communicate with the CAD systems at the PSAPs to inform them that the EOC is initiating a response. As will be explained in further detail below, once the EOC initiates a response, certain activities may occur. For example, resources (e.g. swift water rescue team, fire, ems, etc.) may be transferred from PSAP local control to EOC control, and those resources would no longer be available for PSAP dispatch. PSAP call taking scripts/procedures may be modified to reflect that certain incident types are no longer being handled directly by the PSAP. Other activities are described in further detail below.

A method is provided. The method may comprise monitoring incidents at a public safety answering point (PSAP) to determine how many incidents are emergency operations center (EOC) affecting incidents. The method may further comprise determining a PSAP status, the status based in part on the EOC affecting incidents. The method may further comprise sending the PSAP status to an EOC, wherein the EOC determines if a response will be initiated, based, in part, on the PSAP status. The method may further comprise receiving an indication from the EOC that the response will be initiated. The method may further comprise altering a PSAP operations based on the EOC initiating the response.

In one aspect, the method may further comprise at least one of shifting resources from PSAP control to EOC control and initiating mutual aid requests. In one aspect, the method may further comprise at least one of updating PSAP rules of engagement and updating PSAP scripts. In one aspect, the method may further comprise forwarding EOC related incidents to the EOC for coordinated triage and response. In one aspect, determining the PSAP status further comprises determining a scale of the EOC affecting incidents and basing the PSAP status, in part, on the determined scale. In one aspect, determining the PSAP status further comprises determining a percentage of PSAP resources being utilized for EOC affecting incidents and basing the PSAP status, in part, on the percentage. In one aspect, determining the PSAP status further comprises determining a PSAP call queue occupancy and basing the PSAP status, in part, on the call queue occupancy. In one aspect, sending the PSAP status to the EOC further comprises anonymizing the PSAP status, wherein anonymizing the PSAP status prevents the EOC from receiving incident information that is not needed by the EOC to determine that the response will be initiated.

A system comprising a processor and a non-transitory processor readable medium is provided. The medium contains a set of instructions thereon that when executed by a processor may cause the processor to monitor incidents at a public safety answering point (PSAP) to determine how many incidents are emergency operations center (EOC) affecting incidents. The instructions may further cause the processor to determine a PSAP status, the status based in part on the EOC affecting incidents. The instructions may further cause the processor to send the PSAP status to an EOC, wherein the EOC determines if a response will be initiated, based, in part, on the PSAP status. The instructions may further cause the processor to receive an indication from the EOC that the response will be initiated. The instructions may further cause the processor to alter a PSAP operations based on the EOC initiating the response.

In one aspect, altering the PSAP operations may further comprise instructions that cause the processor to at least one of shift resources from PSAP control to EOC control and initiate mutual aid requests. In one aspect, altering the PSAP operations may further comprise instructions that cause the processor to at least one of update PSAP rules of engagement and update PSAP scripts. In one aspect, altering the PSAP operations may further comprise instructions that cause the processor to forward EOC related incidents to the EOC for coordinated triage and response. In one aspect, determining the PSAP status may further comprise instructions that cause the processor to determine a scale of the EOC affecting incidents and base the PSAP status, in part, on the determined scale. In one aspect, determining the PSAP status may further comprise instructions that cause the processor to determine a percentage of PSAP resources being utilized for EOC affecting incidents and base the PSAP status, in part, on the percentage. In one aspect, determining the PSAP status may further comprise instructions that cause the processor to determine a PSAP call queue occupancy and base the PSAP status, in part, on the call queue occupancy. In one aspect, sending the PSAP status to the EOC may further comprise instructions that cause the processor to anonymize the PSAP status, wherein anonymizing the PSAP status prevents the EOC from receiving incident information that is not needed by the EOC to determine that the response will be initiated.

A method is provided. The method may include receiving public safety answering point (PSAP) status from at least one PSAP within a coverage area of an emergency operations center (EOC). The method may further include aggregating the received PSAP status. The method may further include determining based on the aggregated PSAP status, an EOC response.

In one aspect, the method may further comprise at least one of ensuring EOC action plans are complete and initiating EOC action plans. In one aspect, the method may further comprise initiating an EOC response and notifying PSAPs within the coverage area of the EOC that the EOC has initiated the response. In one aspect, the method may further comprise requesting PSAPs within the coverage area of the EOC to forward EOC related incidents to the EOC.

FIG. 1 is an example of a PSAP/EOC environment in which the public safety answering point to emergency operations center communications techniques described herein may be implemented. Environment 100 may include at least one Public Safety Answering Point (PSAP) 110-1 and at least one Emergency Operations Center (EOC) 150-1. As will be described further below, environment 100 may include a plurality of PSAPs 110-1 . . . n and a plurality of EOCs 150-1 . . . n.

The PSAP 110-1 may be a call center where emergency calls are received. For example, in the United States, calls to the emergency 911 number may be routed to a PSAP. Typically, PSAPs may provide coverage to a defined geographic region. For example, a PSAPs coverage area may include a city, a county, a portion of a state, etc. What should be understood is that all calls originating from a defined geographic area may be routed to the same PSAP.

The PSAP 110-1 may include a computer aided dispatch (CAD) system 115 through which incoming emergency calls 117 are received from the community. As incoming emergency calls are received, emergency call takers/dispatchers may gather information related to the incidents being reported by the emergency callers. This information may be stored within the CAD system. CAD system 115 may be coupled with resource database 130 which may store all resources that are available for the PSAPs use in responding to incidents. For example, resource database may include police, fire, EMS, specialized response teams (e.g. swift water rescue, bomb squad, etc.), etc. that may be available to be dispatched to handle incidents being reported by emergency callers.

The CAD system 115 may also keep track of the current incoming call queue. During periods of light load, it would be expected that there would be no call queue, and that calls are answered and responded to as soon as they are received. During periods of heavy load, the calls may be answered immediately, but then placed in queue for a response. In some cases, calls may not be answered immediately, but placed in queue to wait for an available call taker. In other words, the length of the call queue is an indication of how busy the PSAP currently is. The call queue information may be provided to the PSAP status determination system 129 as will be described in further detail below. In normal operation, emergency calls are received by the PSAP, resources available to the PSAP to respond to the incident are identified, and the PSAP may dispatch those identified resources to the location of the incident.

The environment 100 may include an EOC 150-1. As described above, an EOC may be utilized to respond to incidents that are affecting the community at a larger scale, as opposed to those incidents that only affect a small subset of the community. An EOC may have a coverage area that spans the coverage area of multiple PSAPs. For example, each city in a county may have a PSAP. All of the PSAPs in the county may be covered by a single EOC.

Although a many to one relationships between PSAPs and EOC is described, it should be understood that this structure is for purposes of ease of description only. The relationships between PSAPs and EOCs may be one to many, many to one, or many to many. For example, separate EOCs may exist for different types of incidents (e.g. natural disaster EOC, terrorist attack EOC, etc.). Thus, one PSAP may be connected to multiple EOCs based on the incident type. As should be clear, many to many relationships may be established when there are different EOCs based on incident types and multiple PSAPs associated with each of those EOCs. The techniques described herein are applicable for any possible relationships between PSAPs and EOCs.

The PSAP 110-1 may include incident type identification system 123. The incident type identification system may be used to identify incidents types of incoming emergency calls to determine which of those incidents may be of interest to an EOC. For example, an emergency call reporting a heart attack incident type may not be of interest to the EOC because it is unlikely that a single person having a heart attack is going to have an impact on the community at large. In other cases, an incident type may be of interest to a EOC because it is they type of incident that could affect a community at large. For example, a structure fire incident may individually not be of interest to an EOC, but enough of that type of incident occurring in a unexpectedly small area, may indicate an incident with a wider community impact requiring a response from the EOC. In some implementations, EOCs provide the incident type determination system with the types of incidents each EOC is interested in. As mentioned above, in some cases, a PSAP may be connected to multiple EOCs, with each EOC handling different major incidents (e.g. natural disaster, terrorist attack, etc.). The incident type identification system may receive specific incident types of interest to each of those EOCs and factor that into the reporting of PSAP status to each of the EOCs.

The PSAP 110-1 may include resource utilization determination system 125. In normal operation, the PSAP will receive calls, create incidents in a CAD system, identify available resources to respond to those incidents (e.g. from resource database 130), and dispatch those resources to the incident scene. The resource utilization determination system may keep track of the amount and types of resources that are currently responding to incident types that have been indicated as of interest to the EOC. For example, if structure fires are an incident type that is of interest to an EOC, the amount (e.g. percentage, number, etc.) of fire department resources currently assigned to that incident type may be determined. A large amount of resources assigned to EOC related incident types may indicate a need for an EOC to initiate a response.

The PSAP 110-1 may also include an incident scale determination system 127. The incident scale determination system may determine how large an area within the geographic zone covered by the PSAP is being affected by an incident. For example, flooding in an area consisting of a single street within a city (e.g. burst water main) may be considered an incident with small scale, and would likely not be of interest to the EOC due to the small scale. On the other hand, if 50% of the city is underwater, that may indicate a large scale incident of the type that an EOC would be interested in.

The information from the incident type determination system 123, the resource utilization determination system 125, the incident scale determination system 127, and the call queue length provided by the CAD system may be provided to the PSAP status determination system 129. The PSAP status determination system may take the inputs and determine an overall PSAP status. The PSAP status may be provided to the EOC 150-1 and its use will be described in further detail below. The following description will be based on a single PSAP reporting status to a single EOC. However, this is for ease of description and not by way of limitation. In some implementations, the PSAP may report different statuses to different EOCs, with the specific reported PSAP status being based on the incident types the EOC is interested in.

In one example implementation, the PSAP may have four possible statuses, which will be referred to as code green, code yellow, code orange, and code red. A code green status may indicate the PSAP is operating normally. For example, less than 100% of available resources are being utilized, and of those resources that are being utilized, less than 20% may be assigned to incident types that are of interest to the EOC. Ongoing incidents may be of small scale and there may be no call queue.

A code yellow status may, for example, be defined as less than 100% of available resources being utilized, with between 30% and 60% of the resources that are being utilized assigned to incident types that are of interest to the EOC. Ongoing incidents may be of small to medium scale and there may still be no call queue.

A code orange status may, for example, be defined as 100% resource utilization, with between 60% and 80% of the resources assigned to incident types that are of interest to the EOC. Incident scale may be small to medium and there may be some call queue.

A code red status may, for example, indicate that greater than 100% of PSAP resources are being utilized (e.g. mutual aid protocols may be in effect) with more than 80% of those resources being assigned to incident types that are of interest to the EOC. Incident scale may be medium to large and there may be a significant call queue.

It should be understood that the various statuses and the criteria described above are simply examples, and are not intended to be limiting. The particular threshold values may be dependent on the location in which the system is deployed. For example, in some jurisdictions 80% resource utilization may be common, while in others 20% resource utilization may be considered abnormal. What should be understood is that the threshold levels may be set to reflect the conditions of the geographic area for which the PSAP provides coverage.

The PSAP status determination system 129 may provide the PSAP status to the receive PSAP status system 155 of the EOC 150-1. In addition to the PSAP status, the EOC may also be provided with incident related information. For example, in a flooding incident, the EOC may be provided with the addresses where flooding is occurring. The PSAP may anonymize the incident related data such that the EOC does not receive any personally identifying or other information that would not be needed in order to determine if the EOC should initiate a response. For example, the address where flooding is occurring may be needed by the EOC, but the name of the owner of a house at that address is not necessary. Information that is not necessary may be removed or modified prior to sending to the EOC in order to anonymize the information.

The EOC 150-1 may maintain a resource database 160 of resources that are available to the EOC. In some cases, the EOC may have resources available that would normally not be available to the PSAP. For example, in a flooding situation, the EOC may have access to a city's public works department, and would be able to dispatch dump trucks to move sandbags. Such resources would normally not be available to a PSAP. In addition, the EOC request/command that resources currently assigned to the PSAP resource database 130 be reassigned to the EOC. For example, in normal operation a swift water rescue team may be assigned to the PSAP and is available for the PSAP to dispatch. Upon the EOC initiating a response, the swift water rescue team may be reassigned to the EOC. Requests received at the PSAP that require the swift water rescue team would be forwarded to the EOC for triage and dispatch.

Upon receiving the PSAP status, the EOC 150-1 may determine if a response is going to be initiated. For example, if a PSAP status of code green is received, the EOC may take minimal action. For example, the EOC may ensure that action plans are complete 165 and in place. It should be understood that the EOC, in the normal course of operation, develops action plans in order to prepare for the EOC initiating a response.

Continuing with the example, if a status of code yellow is received, the EOC may initiate the previously prepared action plans 167. It should be understood that initiating the action plan is not the same as initiating a response. Initiating the action plan may include things such as notifying the EOC director of operations that there may be a need to initiate a response. Necessary personnel (e.g. EOC staff, agency heads, etc.) may receive notifications that they should ensure they are reachable in case it become necessary for the EOC to initiate a response.

When a code orange status is received, this may indicate a need for the EOC to initiate a response. For example, the EOC director and relevant agency (e.g. fire, police, ems) heads may meet to determine if an EOC response should be initiated. The decision to initiate a response may still remain with EOC personnel in consultation with other stakeholders. When a code red status is received, the EOC may automatically initiate a response. Activities that may occur once an EOC has initiated a response are described in further detail below.

The example operation of the EOC was based on receiving status from a single PSAP. It should be understood that the EOC may receive status from multiple PSAPs and that the combination of the status may determine if the EOC initiates a response. For example, if the EOC receives status from two PSAPs, and one is reporting orange while the other is reporting green, this may indicate that the incidents are only affecting the area covered by a single PSAP, and are not affecting the community more broadly. The techniques described herein are not intended to be limited to the specific example provided. An actual implementation would need to take into account the specific nature of the environment in which it is deployed.

Once the EOC 150-1 has determined that a response is going to be initiated, several actions may occur. The EOC may initiate the response and alert the PSAP 169 that the response is being initiated through the alter PSAP operation system 131. Alerting the PSAP may encompass several different activities. For example, the PSAP may be requested to allocate/earmark resources for use by the EOC. The alter PSAP operations system may remove resources from the PSAP resource database 130 and add those resources to the EOC resource database 160, such that they are no longer available to be dispatched by the PSAP. As such, any PSAP resource recommendation algorithms would no longer take into consideration those resources allocated to the EOC. In addition, the notification that the EOC has initiated a response and has requested resources may trigger the PSAP to initiate mutual aid protocols in order to obtain resources to back fill those that have been allocated to the EOC. What should be understood is that even though the EOC has initiated a response for the type of incident the EOC is interested in, the PSAP must still respond to all other normal life types of incidents.

The EOC 150-1 may also initiate the response by requesting incident forwarding 171 of all incidents of the type that are now going to be handled by the EOC. It should be understood that the type of incident being handled by the EOC may also include a location component. For example, a structure fire near an ongoing forest fire may be forwarded to the EOC, whereas a standalone structure fire may be handled by the PSAP. By forwarding all incidents of the specified type, the EOC is able to properly triage the incidents and dispatch responders in a more efficient way by taking into account all of the requests that are being received from the EOC coverage area. In response, the alter PSAP operations system may cause the PSAP to alter the way it handles incoming calls. For example, 911 call takers scripts and rules of engagement may be altered to reflect that certain types of incidents are no longer being handled by the PSAP (e.g. instead of waiting on the line while responders are dispatched, the rules of engagement may be changed to notify the caller to call back if no responder has arrived within a certain period of time).

Figure 4:
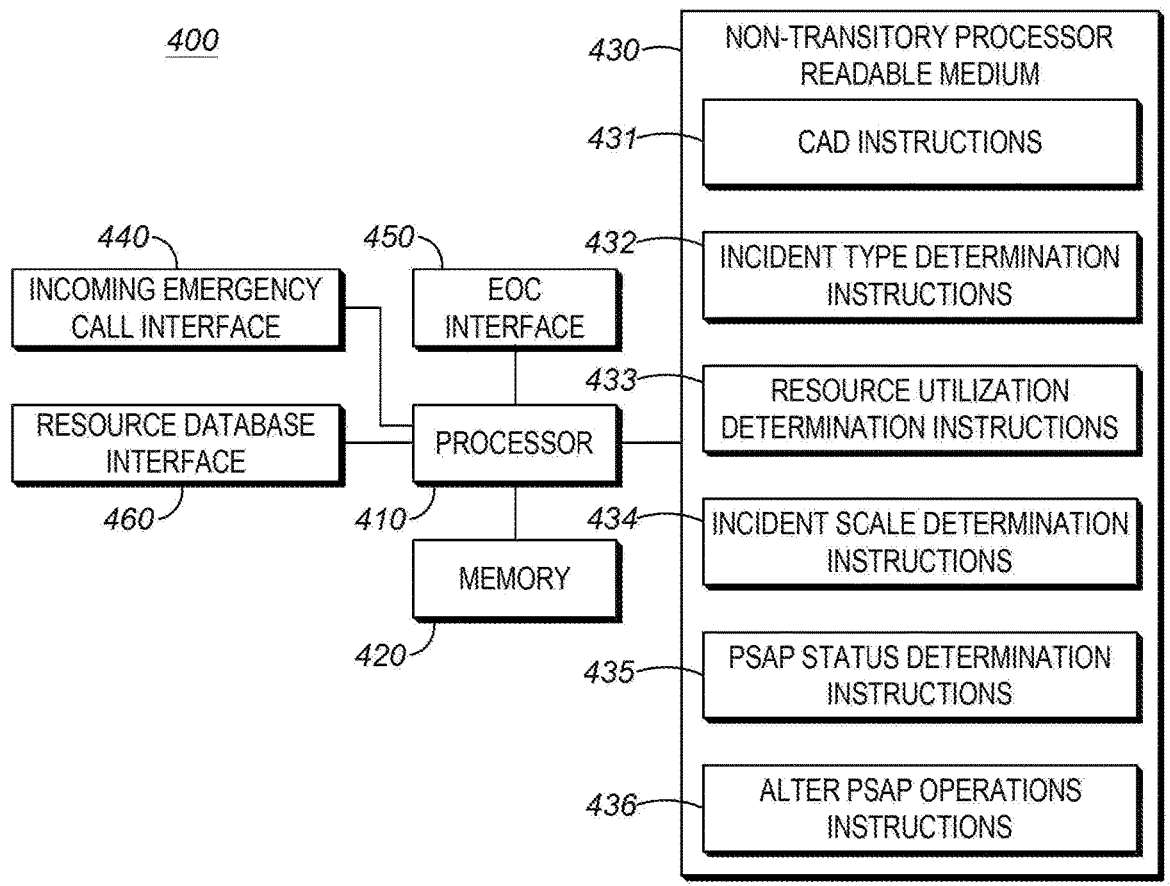
FIG. 4 is an example of a computing device that may implement the functionality of a PSAP in accordance with the techniques described herein.
Figure 5:
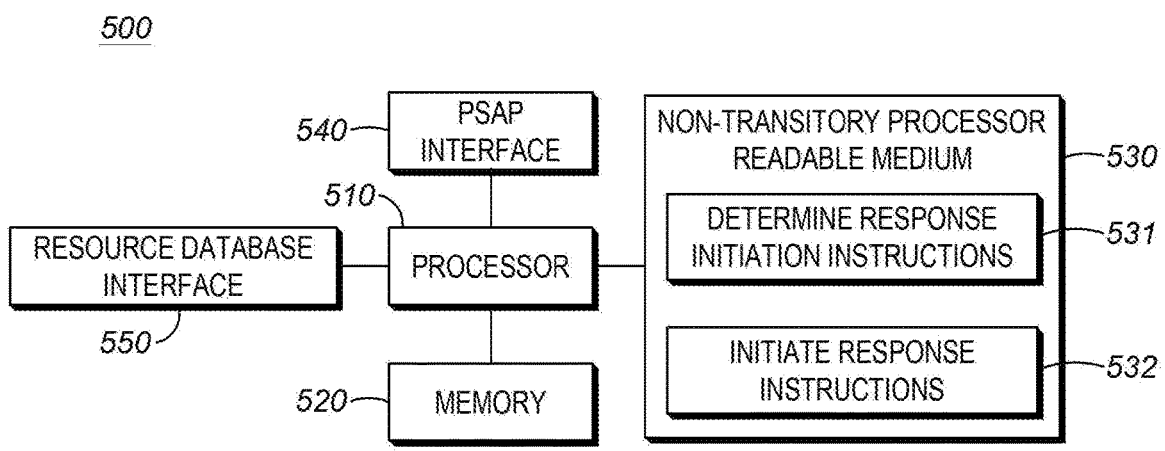
FIG. 5 is an example of a computing device that may implement the functionality of an EOC in accordance with the techniques described herein.

Although environment 100 has been described in terms of several different systems, it should be understood that this is not intended to imply that the functions be implemented on independent computer systems. For example, all of the functionality described for the PSAP 110-1 may be implemented on a single computer, or several interconnected computers. The same holds true for the systems described with respect to the EOC 150-1. FIGS. 4 and 5 describe computing systems on which the techniques described herein may be implemented.

Figure 2:
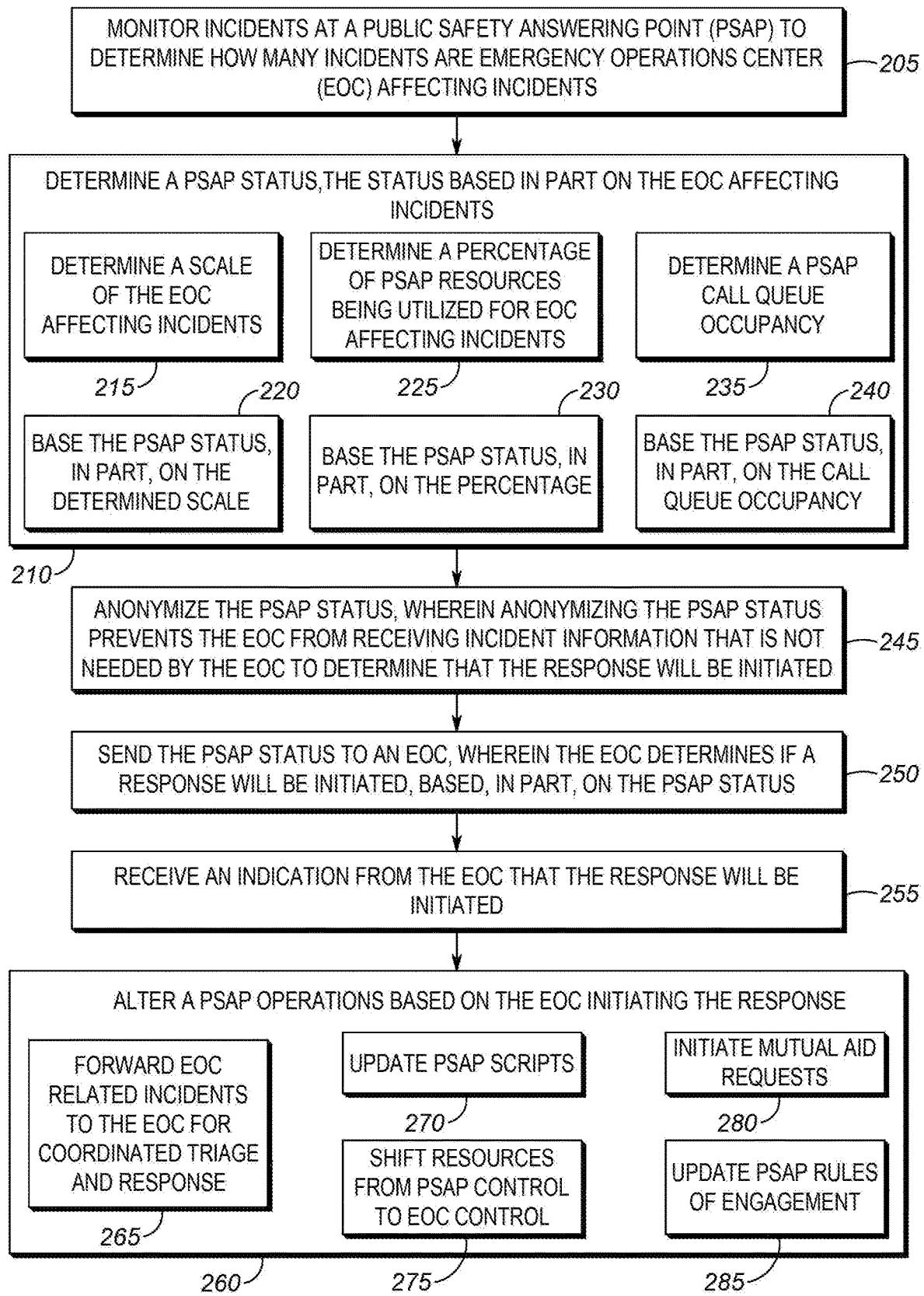
FIG. 2 is an example flow diagram for a PSAP in accordance with the techniques described herein.

FIG. 2 is an example flow diagram for a PSAP in accordance with the techniques described herein. In block 205 incidents at a PSAP may be monitored to determine how many incidents are EOC affecting incidents. The EOC is tasked with handling certain types of incidents, once it has been determined that the occurrence of those types of incidents has expanded beyond normal life, and are now affecting the community at a larger scale. PSAPs may be monitored to make a determination as to when the incidents have transitioned from normal life to wider community impact. In some cases, the ability of the PSAP to handle the load of incidents is a factor when determining if the EOC will initiate a response.

In block 210, PSAP status may be determined. The PSAP status may be based in part of EOC affecting incidents. Based on the monitoring in block 205, each PSAP may determine a PSAP status. The PSAP status may be used by an EOC to determine when a response by the EOC should be initiated. The PSAP status may be based on many factors. For example, in block 215, a scale of EOC affecting incidents may be determined. Fires may be considered EOC affecting incidents. The scale of an incident may indicate, for example, the portion of a community that is affected by an incident. For example, a single family home structure fire would have a smaller scale than a thousand-unit apartment complex structure fire. In block 220, the PSAP status may be based, in part, on the determined scale.

In block 225, a percentage of PSAP resources being utilized for EOC affecting incidents may be determined. The percentage of resources utilized by a PSAP for EOC affecting incidents may indicate that a larger scale incident is occurring. In such cases, it may be beneficial to have a more coordinated response, such as that provided by an EOC to make better use of the resources that are available. In block 230, the PSAP status may be based, in part, on the percentage of PSAP resources being utilized for EOC affecting incidents.

In block 235, a PSAP call queue occupancy may be determined. The PSAP call queue occupancy may be an indication of how busy the PSAP is by measuring how many calls are being concurrently received by the PSAP. A large call queue (e.g. many calls being received) may indicate that an incident is occurring that is affecting large portions of the community, which is causing members of the community to call the PSAP for assistance. In block 240, the PSAP status may be based, in part, on the call queue occupancy.

Although several example metrics have been provided to illustrate the types of information that may be utilized to determine PSAP status, it should be understood that the examples are not intended to be an exhaustive list. In general, PSAP status may be based on any information that would likely indicate to an EOC that a larger scale, community affecting incident, is in progress.

In block 245, the PSAP status may be anonymized. Anonymization of the PSAP status may prevent the EOC from receiving incident information that is not needed by the EOC to determine that the response will be initiated. When a PSAP is collecting information, certain details (e.g. names of people involved in the incident) may be captured. In many cases, these details are not needed by the EOC in order to determine if a response is to be initiated. For example, in the case of a wild fire threatening hundreds of homes, the names of the individual homeowners is not need by the EOC, as the EOC is only interested in the aggregate incident details. Such information may be anonymized prior to sending incident related data to the EOC in order to ensure that only information relevant to the decision to initiate a response is ever sent to the EOC. Minimizing the amount of such information may alleviate concerns of data breaches, and may make PSAP administrators more comfortable with sharing PSAP status information with EOCs.

In block 250, the PSAP status may be sent to an EOC. The EOC may determine if a response will be initiated based, in part, on the PSAP status. As mentioned above, the EOC may receive PSAP status from one or more PSAPs. Based on the PSAPs status, the EOC may determine that an incident has become one that is no longer normal life and is affecting the wider community. The EOC may initiate a response based on the status received form the PSAPs.

In block 255, an indication may be received from the EOC that the EOC will initiate a response. As explained above, once certain thresholds are reached, it may be determined that a wide scale incident may be better handled through a coordinated EOC response, rather than through responses managed by individual PSAPs. Once this determination is made, the EOC may notify the PSAPs that the EOC is initiating a response.

In block 260, the PSAP may alter operations based on the EOC initiating the response. As explained above, once the EOC has initiated a response, the PSAP may alter its operations to reflect the fact that the response for certain EOC affecting incidents are no longer being managed by the PSAP itself, but rather the management of those wider incidents is being handled by the EOC.

For example, in block 265, the PSAP may alter it operation by forwarding EOC related incidents to the EOC for coordinated triage and response. Thus, instead of the PSAP managing the response by identifying available resources and dispatching those resources to the incident, the PSAP may delegate this management to the EOC. The EOC may then identify available resources and coordinate the response.

In block 270, PSAP scripts may be updated. For example, when the PSAP is handling the response in a normal life situation, a call taker script may task the call taker with remaining on the line and keeping the caller calm until first responders arrive. Once the EOC has initiated a response, the script may be modified to cause the call taker to notify the caller that their request for service has been received, but there are large numbers of callers with similar incidents. The script may be modified to have the call taker let the caller know that if help has not arrived within a certain time period, that they should call back.

In block 275, resources may be shifted from PSAP control to EOC control. As explained above, once the EOC has initiated a response, resources that would normally be dispatched by the PSAP may be reassigned so that they are under control of the EOC. For example, a PSAP may have a swift water rescue team available for dispatch to incidents being handled by the PSAP. Upon occurrence of a widespread flooding incident, the swift water rescue team may be placed under the control of the EOC, in order for that team to be dispatched in a more coordinated manner with respect to other PSAPs within the EOC's coverage area.

In block 280, mutual aid requests may be issued. As explained above with respect to block 275, in some cases resources may shifted from PSAP control to EOC control. However, the need for those resources within the PSAP coverage area may not necessarily directly correspond with the incidents that are being handled by the EOC. For example, consider the case of a gas line explosion that has set an entire neighborhood on fire. Such an incident may cause PSAP fire resources to be shifted to PSAP control. However, this does not mean that all fire related incidents within the PSAP coverage area are being handled by the EOC. For example, there may be a new call received for a normal life type kitchen fire in a single house in a part of the city completely unaffected by the gas line explosion. In such a case, the PSAP may make requests according to existing mutual aid policies to backfill those resources whose control has shifted to the EOC.

In block 285, PSAP rules of engagement may be modified. The PSAP rules of engagement may dictate how PSAP personnel engage with members of the public. The techniques described herein are applicable to any type of rules of engagement that may be modified once the EOC has initiated a response.

Although several examples of alterations of PSAP operations have been described in block 260, it should be understood that this is not intended to be an exhaustive list. Other alterations to PSAP operations procedures are known with respect to EOCs initiating a response. The techniques described herein are not limited to any specific types of alteration of PSAP operations and are applicable to any alteration to PSAP operations that may occur when an EOC initiates a response.

Figure 3:
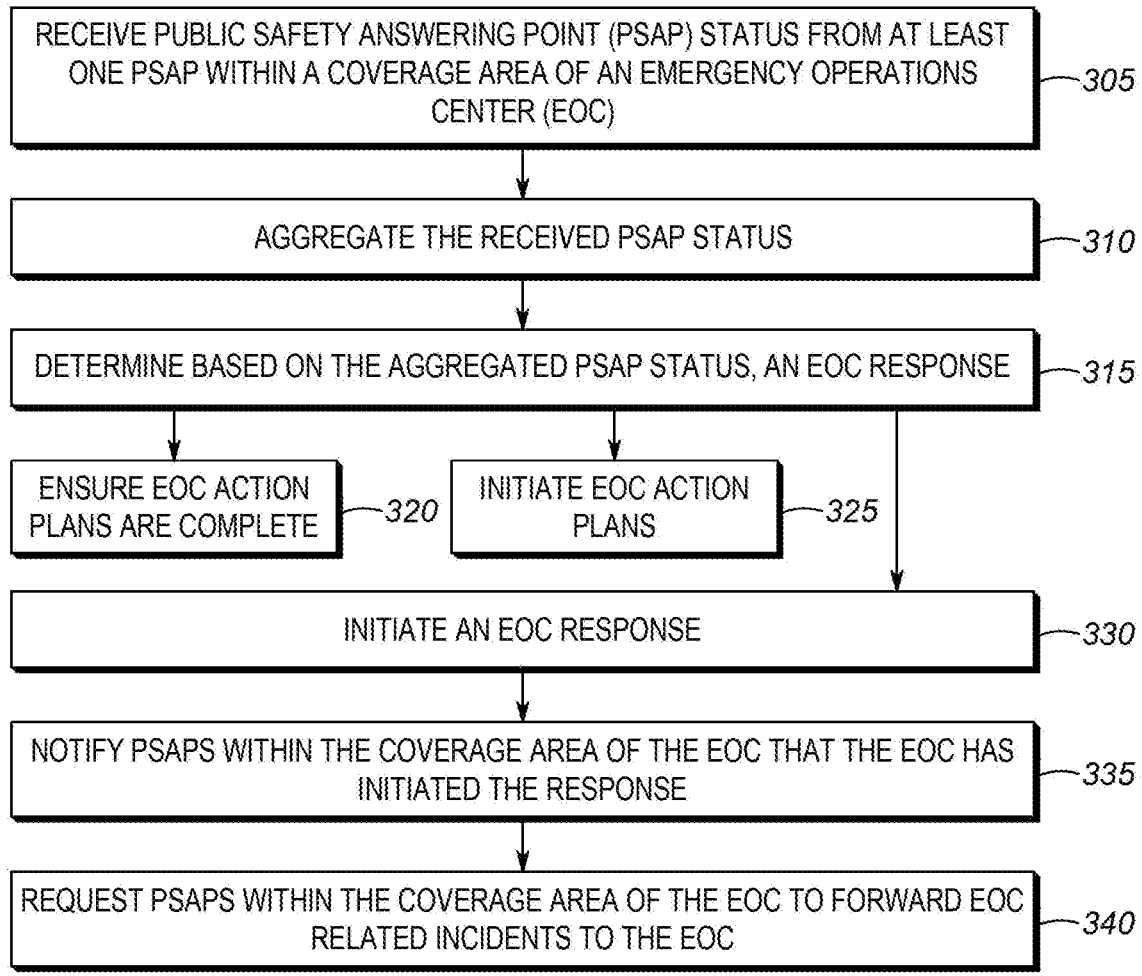
FIG. 3 is an example flow diagram for a EOC in accordance with the techniques described herein.

FIG. 3 is an example flow diagram for a EOC in accordance with the techniques described herein. In block 305, PSAP status may be received from at least one PSAP within a coverage area of an EOC. As explained above, there is no requirement for a one to one relationship between PSAPs and EOCs. In many cases, one EOC may cover the same physical coverage area of two or more PSAPs. In other cases, a PSAP may be within the coverage area of multiple EOCs (e.g. citywide, countywide, statewide, etc.). In some cases, a PSAP may be associated with different EOCs for different incident types (e.g. earthquake response EOC, wildfire response EOC, terrorist action response EOC, etc.). In block 305 the EOC may receive PSAP status from any and all PSAPs within that EOCs coverage area.

In block 310, the received PSAP status may be aggregated. As explained above, in some cases it may not be possible to determine if an incident has risen to the level of requiring an EOC response by just looking at an individual PSAP's status. What might be thought of as normal life incidents for a given PSAP, when viewed in the context of similar incidents in related PSAPs, may indicate an incident that is impacting the community at a much larger scale, and may warrant an EOC response.

In block 315, based on the aggregated PSAP status, and EOC response may be determined. For example, when certain thresholds are reached (e.g. resources occupied, call queue occupancy, incident scale, etc.), the EOC may determine that a response should or should not be initiated. One example is shown in block 320 where the response is to ensure that EOC action plans are complete. In essence, this is not really a response, as EOC action plans are developed over the long term, and not in response to a given specific major incident. In other words, block 320 may indicate that the EOC is ready to initiate a response, if it is later deemed necessary.

Another possible response is shown in block 325 in which EOC action plans are initiated. Initiating of EOC action plans does not mean that the EOC is initiating a response, but rather means that the EOC is making sure that it is ready to initiate a response, if needed. For example, directors of various agencies (e.g. EOC director, police chiefs within EOC coverage area, fire chiefs within EOC coverage area, etc.) may be notified that PSAP status is such that the EOC may initiate a response. Thus, the notified parties may be made aware that there is a distinct possibility that the EOC may initiate a response, and those notified personnel should be prepared for their respective agencies to shift to a mode where the EOC has initiated a response.

In block 330, an EOC response may be initiated. Initially, as explained above with the code orange response level, the EOC response may be trigger a discussion between the relevant stake holders as to if the EOC should initiate a response at all. However, in other cases, such as the code red response level indicated above, the EOC initiating a response may be automatic, due to the severity of the PSAPs status.

In block 335, the PSAPs within the coverage are of the EOC that has initiated a response may be notified that the response has been initiated. Those notified PSAPs may then begin to change their modes of operation as describe above to reflect that the EOC has initiated a response and that incident response for EOC affecting incidents may be handled through the EOC. In block 340, it may be requested that PSAPs within the coverage area of the EOC forward EOC related incidents to the EOC. In other words, once the EOC has initiated a response, EOC related incidents should be forwarded to the EOC for proper triage and dispatch of responders across all PSAPs within the EOC coverage area. The PSAPs themselves will no longer be in charge of those incidents and control will reside with the EOC.

FIG. 4 is an example of a computing device that may implement the functionality of a PSAP in accordance with the techniques described herein. It should be understood that FIG. 4 represents one example implementation of a computing device that utilizes the techniques described herein. Although only a single processor is shown, it would be readily understood that a person of skill in the art would recognize that distributed implementations are also possible. For example, the various pieces of functionality described above (e.g. CAD instructions, incident type determination instructions, etc.) could be implemented on multiple devices that are communicatively coupled. FIG. 4 is not intended to imply that all the functionality described above must implemented on a single device.

Device 400 may include processor 410, memory 420, non-transitory processor readable medium 430, incoming emergency call interface 440, EOC interface 450, and resource database interface 460.

Processor 410 may be coupled to memory 420. Memory 420 may store a set of instructions that when executed by processor 410 cause processor 410 to implement the techniques described herein. Processor 410 may cause memory 420 to load a set of processor executable instructions from non-transitory processor readable medium 430. Non-transitory processor readable medium 430 may contain a set of instructions thereon that when executed by processor 410 cause the processor to implement the various techniques described herein.

For example, medium 430 may include CAD instructions 431. The CAD instructions may cause device 400 to implement the functionality of a CAD system. For example, the CAD instructions may cause the device to receive incoming emergency calls from the public through the incoming emergency call interface 440. The incoming emergency call interface may be an interface to a system such as the publically switched telephone network (PSTN, cellular telephony systems, text message systems, etc.). The techniques described herein are not limited to any particular source of incoming emergency calls. The CAD instructions may cause the device 400 to identify resources to dispatch to incidents by using the resource database interface 460 to access a database of available resources. The techniques described herein are not limited to any particular type of resource database. The CAD instructions may cause the processor to determine a length of a call queue at the PSAP which generally corresponds to blocks 235-240.

Medium 430 may also include incident type determination instructions 432 that cause the processor to determine which incidents may be of a type that are of interest to an EOC and keep track of those incidents. The incident type determination instructions may generally correspond to block 205. Medium 430 may also include resource utilization determination instructions 433 that may cause the processor to determine how many resources that are currently assigned to incidents are assigned to incident types that are of interest to an EOC. The resource utilization determination instructions generally correspond to block 225-230.

Medium 430 may also include incident scale determination instructions 434 which may cause the processor to determine the scale of incidents that are being received by the PSAP. The incident scale determination instructions may generally correspond to blocks 215-220. Medium 430 may include PSAP status determination instructions 435 which may cause the processor to determine the current status of the PSAP based on the previous determinations. The PSAP status determination instructions may also cause the processor to send the PSAP status, through the EOC interface 450, to at least one EOC. The EOC interface may be any type of interface that allows a PSAP and EOC to be communicatively coupled. For example, the interface may be a wired or wireless network connection, such as the public Internet, a private intranet, a permanent hardwired connection, etc. The techniques described herein may utilize any available form of electronic communication between the PSAP and the EOC. In some cases, the PSAP status determination instructions may anonymize incident data prior to sending it to the EOC. The PSAP status determining instructions generally correspond to blocks 210, and 245-250.

The medium 430 may also include alter PSAP operations instructions 436 which may be used by the processor to cause the PSAP to receive an indication from the EOC, through the EOC interface 450, to request that the PSAP alter its operations. For example, the instructions may cause the PSAP to forward relevant incidents to the EOC for coordinated response and triage, update PSAP scripts, shift resources from PSAP control to EOC control, initiate mutual aid requests, and update PSAP rules of engagement. The alter PSAP operations instructions generally correspond with blocks 260-285.

FIG. 5 is an example of a computing device that may implement the functionality of an EOC in accordance with the techniques described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. determine response initiation instructions, initiate response instructions, etc.) could be implemented on multiple devices that are communicatively coupled. FIG. 5 is not intended to imply that all the functionality described above must implemented on a single device.

Device 500 may include processor 510, memory 520, non-transitory processor readable medium 530, PSAP interface 540, and resource database interface 550.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include determine response initiation instructions 531 which may be used by the processor to determine if the EOC should initiate a response. For example, the processor may utilize PSAP interface 540 to receive incident and PSAP status information from the PSAP in order to determine if a response should be initiated. The PSAP interface may be any type of interface that allows a PSAP and EOC to be communicatively coupled. For example, the interface may be a wired or wireless network connection, such as the public Internet, a private intranet, a permanent hardwired connection, etc. The techniques described herein may utilize any available form of electronic communication between the PSAP and the EOC. In some cases, PSAP status from multiple PSAPs is aggregated to determine if a response should be initiated. The determine response initiation instructions generally correspond to blocks 305-315.

The medium 530 may also include initiate response instructions 532 that may cause the processor of the EOC to initiate a response. Initiating a response may include ensuring action plans are complete, initiating those action plans, and initiating a response. Initiating a response can include notifying connected PSAPs that a response is being initiated, as well as requesting PSAPs forward EOC related incidents to the EOC. Furthermore, resources that were previously under the control of the PSAP may be transferred to the control of the EOC. For example, the processor, using the resource database interface 550, may cause the EOC resource database to reflect resources that are now under the control of the EOC and are available for the EOC to dispatch. The initiate response instructions may generally correspond to blocks 320-340.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. References to at least one of element A and B means at least one of element A alone, at least one of element B alone, or any combination of any number of elements A and B together. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc read only memory (CD-ROM), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (IC) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   monitoring incidents at a public safety answering point (PSAP) to determine how many incidents are emergency operations center (EOC) affecting incidents;
   determining a PSAP status, the status based in part on the EOC affecting incidents;
   sending the PSAP status to an EOC, wherein the EOC determines if a response will be initiated, based, in part, on the PSAP status;
   receiving an indication from the EOC that the response will be initiated; and
   altering a PSAP operations based on the EOC initiating the response, wherein altering the PSAP operations further comprises at least one of:
      updating PSAP rules of engagement; and
      updating PSAP scripts.

2. The method of claim 1 wherein altering the PSAP operations further comprises at least one of:
   shifting resources from PSAP control to EOC control; and
   initiating mutual aid requests.

3. The method of claim 1 wherein altering the PSAP operations further comprises:
   forwarding EOC related incidents to the EOC for coordinated triage and response.

4. The method of claim 1 wherein determining the PSAP status further comprises:
   determining a scale of the EOC affecting incidents; and
   basing the PSAP status, in part, on the determined scale.

5. The method of claim 1 wherein determining the PSAP status further comprises:
   determining a percentage of PSAP resources being utilized for EOC affecting incidents; and
   basing the PSAP status, in part, on the percentage.

6. The method of claim 1 wherein determining the PSAP status further comprises:
   determining a PSAP call queue occupancy; and
   basing the PSAP status, in part, on the call queue occupancy.

7. The method of claim 1 wherein sending the PSAP status to the EOC further comprises:
   anonymizing the PSAP status, wherein anonymizing the PSAP status prevents the EOC from receiving incident information that is not needed by the EOC to determine that the response will be initiated.

8. A system comprising:
   a processor; and
   a non-transitory processor readable medium containing a set of instructions thereon that when executed by a processor cause the processor to:
      monitor incidents at a public safety answering point (PSAP) to determine how many incidents are emergency operations center (EOC) affecting incidents;
      determine a PSAP status, the status based in part on the EOC affecting incidents;
      send the PSAP status to an EOC, wherein the EOC determines if a response will be initiated, based, in part, on the PSAP status;
      receive an indication from the EOC that the response will be initiated; and
      alter a PSAP operations based on the EOC initiating the response; wherein altering the PSAP operations further comprises instructions that cause the processor to at least one of:
         update PSAP rules of engagement; and
         update PSAP scripts.

9. The medium of claim 8 wherein altering the PSAP operations further comprises instructions that cause the processor to at least one of:
   shift resources from PSAP control to EOC control; and
   initiate mutual aid requests.

10. The medium of claim 8 wherein altering the PSAP operations further comprises instructions that cause the processor to:
    forward EOC related incidents to the EOC for coordinated triage and response.

11. The medium of claim 8 wherein determining the PSAP status further comprises instructions that cause the processor to:
    determine a scale of the EOC affecting incidents; and
    base the PSAP status, in part, on the determined scale.

12. The medium of claim 8 wherein determining the PSAP status further comprises instructions that cause the processor to:
    determine a percentage of PSAP resources being utilized for EOC affecting incidents; and
    base the PSAP status, in part, on the percentage.

13. The medium of claim 8 wherein determining the PSAP status further comprises instructions that cause the processor to:
    determine a PSAP call queue occupancy; and
    base the PSAP status, in part, on the call queue occupancy.

14. The medium of claim 8 wherein sending the PSAP status to the EOC further comprises instructions that cause the processor to:
    anonymize the PSAP status, wherein anonymizing the PSAP status prevents the EOC from receiving incident information that is not needed by the EOC to determine that the response will be initiated.

* * * * *